United States Patent [19]

Kanda

[11] Patent Number: 4,953,034
[45] Date of Patent: Aug. 28, 1990

[54] SIGNAL REGENERATION PROCESSOR WITH FUNCTION OF DROPOUT CORRECTION

[75] Inventor: Masao Kanda, Saitama, Japan

[73] Assignee: Pioneer Electronic Corporation, Tokyo, Japan

[21] Appl. No.: 286,832

[22] Filed: Dec. 20, 1988

[30] Foreign Application Priority Data

Jan. 21, 1988 [JP] Japan .................................. 63-11511

[51] Int. Cl.[5] .............................................. H04N 5/94
[52] U.S. Cl. .................................................. 358/336
[58] Field of Search ................ 360/38.1; 358/336, 314

[56] References Cited

U.S. PATENT DOCUMENTS

| 4,394,762 | 7/1983 | Nabeshima | 360/38.1 |
| 4,467,373 | 8/1984 | Taylor et al. | 360/38.1 |
| 4,518,996 | 5/1985 | Reitmeier et al. | 360/38.1 |
| 4,670,881 | 6/1987 | Imoto | 360/38.1 |
| 4,675,754 | 6/1987 | Endo et al. | 360/38.1 |
| 4,680,763 | 7/1987 | Suma et al. | 360/38.1 |
| 4,796,243 | 1/1989 | Kato | 360/38.1 |
| 4,812,925 | 3/1989 | Opelt | 360/38.1 |

*Primary Examiner*—Robert L. Richardson
*Attorney, Agent, or Firm*—Sughrue, Mion, Zinn, Macpeak & Seas

[57] ABSTRACT

A signal regeneration processor which carries out dropout correction for a signal by replacing a prescribed number of low-order bits of a signal obtained by delaying a digitized regenerated signal by a prescribed length of time, with a prescribed code in accordance with a dropout detection signal, and then by writing the signal in a signal processing memory according to the prescribed code contained in the data read from the memory. Since it is possible to confirm in advance the occurrence of a dropout on the reading side of the memory and to carry out dropout correction by address manipulation of the memory, a line memory for replacing a video data at the time of dropout correction can be eliminated.

8 Claims, 4 Drawing Sheets

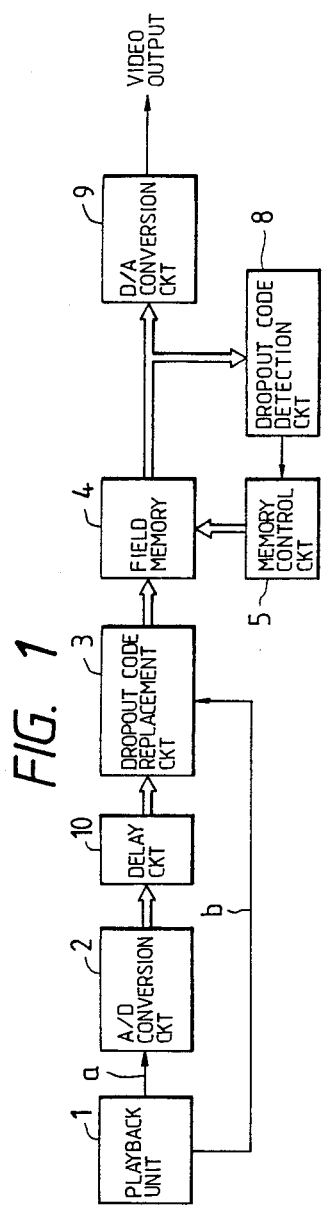

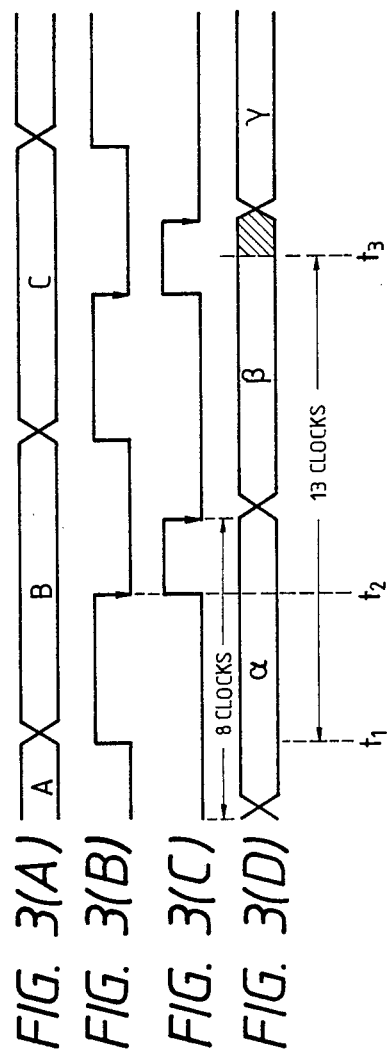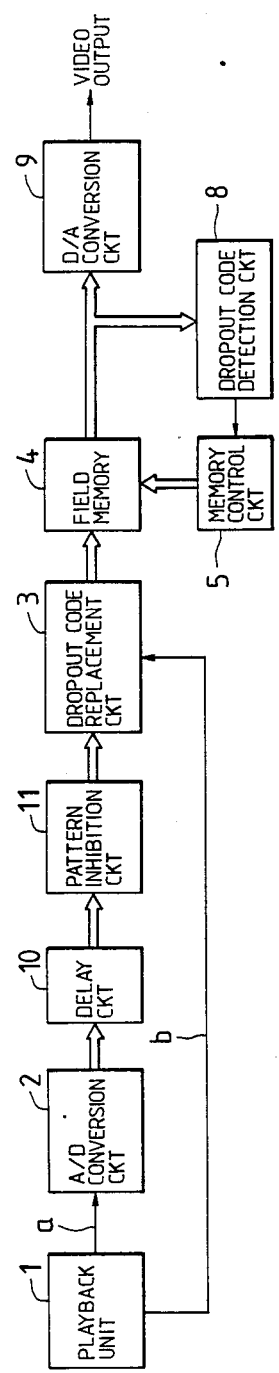

SIGNAL REGENERATION PROCESSOR WITH FUNCTION OF DROPOUT CORRECTION

FIELD OF THE INVENTION

The present invention relates to a device for carrying out signal processing by the use of a memory after reading signals recorded in a recording medium such as a video disk.

BACKGROUND OF THE INVENTION

By reading a video signal recorded in a recording medium such as a video disk, then writing it as a digital signal in a memory, followed by starting to read that stored signal with a timing which has a prescribed time difference from the start timing, there is, obtained a video signal that has a signal read from the recording medium. In addition, it is possible to give a special processing such as reduction, amplification or the like to the signal by controlling the address at the time of reading it from the memory. A signal regeneration processor which executes regeneration and processing of a video signal based on such knowledge has already been disclosed.

On the other hand, in regenerated signals obtained from the recording medium there may be generated missed portions of the signals, the so-called dropout, due to flaws in the recording medium, adherence of dirt on it or the like. In addition, it is known that in a regenerated signal there often exists a time axis error due to uneven rotation or the like of the disk or the like. Accordingly, it is indispensable in a signal regeneration processor to provide for means to correct the dropout, the time axis error and the like. Such a signal regeneration processor is shown in FIG. 8.

In FIG. 8, video signal a which is an output from a playback unit 1 such as a video disk player is supplied to an A/D (analog to digital) conversion circuit 2. Further, in the playback unit 1 there is incorporated, for example, a dropout detection circuit which outputs a dropout detection signal b that indicates the occurrence of a dropout when the interval between the zero-crossing points of RF signals read from the recording medium exceeds a predetermined value.

In the A/D conversion circuit 2, a video signal is sampled and the obtained sample value is converted to a corresponding n-bit digital data by quantizing it. The video data output from the A/D conversion circuit 2 is supplied to a dropout code replacement circuit 3. To the dropout code replacement circuit 3 there is supplied a dropout detection signal b from the playback unit 1, and the dropout code replacement circuit 3 replaces the video data during the dropout period with a dropout code consisting, for example, of the upper limit code for the n-bit digital code by means of the dropout detection signal b.

A video data output from the dropout code replacement circuit 3 is supplied to a field memory 4. The field memory 4 possesses a storage capacity which can store n-bit video data output during one field period. Further, a write and read address signal and a write and read control signal are supplied to the field memory 4 from a memory control circuit 5.

Data read from the field memory 4 is supplied to a line memory 6, a changeover switch 7 and a dropout code detection circuit 8. The line memory 6 consists of FIFO (first in and first out) memory having a storage capacity sufficient to store data obtained during one horizontal scanning period (referred to as 1H hereinafter). Data read from the field memory 4 by the line memory 6 is delayed by 1H and is supplied to one of the input terminals of the changeover switch 7. To the other input terminal of the changeover switch 7 there is directly supplied data read from the field memory 4. In addition to the controlled input terminal of the changeover switch 7 there is supplied the output of the dropout code detection circuit 8 as the changeover command signal. The changeover switch 7 is constructed so that it selectively outputs data read from the memory 6 in the presence of a changeover command signal, and selectively outputs data read from the memory 4 in the absence of a changeover command signal. Further the dropout code detection circuit 8 is arranged to output a detection signal when there exists a dropout code in a data read from the field memory 4. Consequently, video data output from the changeover switch 7 is replaced by the video data at the time earlier than that time when there occurs a dropout, in order to correct the dropout. The output data of the changeover switch 7 is supplied to a D/A conversion circuit 9 where it is converted to an analog signal to become a video signal.

As described above, in the prior art signal regeneration processor there is needed a line memory on the reading side of the field memory. The line memory is required to operate at a high speed, and is very expensive, and it is difficult to improve the actual efficiency because of its high consumption of power. For these reasons, the prior art device has a drawback in that its manufacturing costs are high and that it is difficult to realize a reduction in power consumption and rendering the device small in size.

SUMMARY OF THE INVENTION

The present invention was contrived in view of the drawbacks existing in the prior art device, and it is, therefore, the object of the present invention to provide a signal regeneration processor which is capable of carrying out signal processing, as well as signal dropout correction, without the use of a line memory.

According to one feature of the signal regeneration processor of the present invention, after a predetermined number of low-order bits of a signal obtained by delaying the digitized regenerated signal by a prescribed length of time the signal is replaced by a predetermined code according to a dropout detection signal and is written in a memory for signal processing, and dropout correction is carried out in accordance with a prescribed code included in the data read from the memory.

The above and other objects, features and advantages of the present invention will become apparent from the following detailed description taken with the accompanying drawings.

BRIEF DESCRIPTION OF THE DRAWINGS

FIG. 1 is a block diagram showing an embodiment of the present invention;

FIG. 2 is a circuit diagram showing a concrete circuit example for a part of the device in FIG. 1;

FIG. 3, consisting of 3(A)–3(D), is a timing chart showing the operation of the device in FIG. 1;

FIG. 4 is a block diagram showing another embodiment of the present invention;

DETAILED DESCRIPTION OF THE INVENTION

Figure 7:
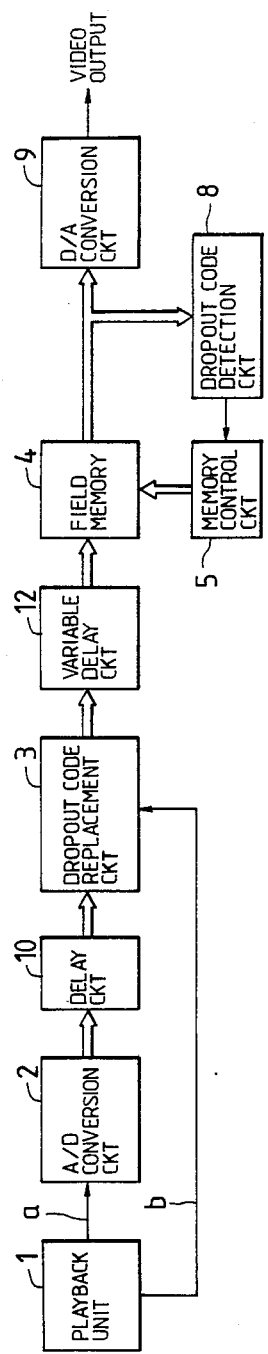
FIG. 7 is a block diagram showing still another embodiment of the present invention.

Referring to FIGS. 1 and 7, embodiments of the present invention will now be described in detail.

Figure 8:
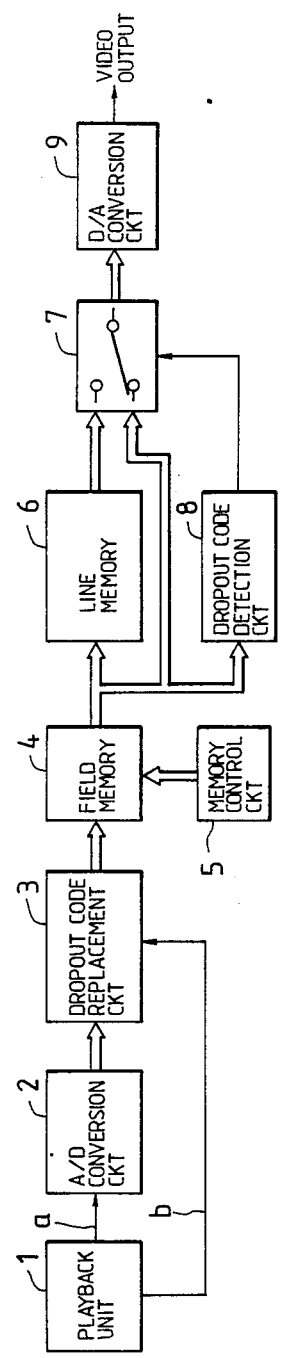
FIG. 8 is a block diagram showing the prior art signal regeneration processor.

As shown in FIG. 1, playback unit 1, A/D conversion circuit 2, dropout code replacement circuit 3, field memory 4, memory control circuit 5 and dropout code detection circuit 8 are connected in the same way as in the device of FIG. 8. However, in this example, n-bit video data output from the A/D conversion circuit 2 is supplied to the dropout code replacement circuit 3 after it is delayed by a prescribed length of time by a delay circuit 10 consisting of shift registers and the like.

The dropout code replacement circuit 3 has a constitution by which when a dropout detection signal b is provided by the playback unit 1, for example, it replaces the lower two bits, $D_0$ and $D_1$, of an n-bit video data delayed by the delay circuit 10 with "1" for four clock periods.

In addition, data read from the field memory 4 is supplied to a dropout code detection circuit 8 as well as directly to a D/A conversion circuit 9 simultaneously. The dropout code detection circuit 8 is constructed so as to generate a code detection signal when the lower two bits $D_0$ and $D_1$ of a data read from the field memory 4 stays at "1" for four clock periods. The code detection signal output from the dropout code detection circuit 8 is supplied to the memory control circuit 5. The memory control circuit 5 has a constitution by which it controls the field memory 4, in the same way as for the device in FIG. 8 in the absence of a code detection signal, and changes the address value of the read address to the value corresponding to the time which occured 2H earlier, to thereby read the video data corresponding to the time by 2H earlier, in the presence of a code detection signal.

Now, concrete constitutions of the dropout code replacement circuit 3 and the field memory 4 for the case when "n" the number of quantization bits of the A/D conversion circuit 2, equals to 8.

In FIG. 2, the upper six bits, $D_2$ to $D_7$, of the 8-bit digital data supplied to the dropout code replacement circuit 3 from the delay circuit 10 are output as they are and are supplied to the field memory 4. However, the lower two bits. $D_0$ and $D_1$, are supplied to one of the input terminals of the changeover switches 31 and 32, respectively. To the other terminal of each of the changeover switches 31 and 32 is applied a power supply voltage Vcc. The controlled input terminal of each of the changeover switches is supplied with the output of a monostable multivibrator 33. The monostable multivibrator 33 has a constitution such that it is triggered by a dropout detection signal b to have its output inverted over four clock periods. The changeover switches 31 and 32 selectively output bits $D_0$ and $D_1$, respectively, when the output of the monostable multivibrator 33 is not inverted, while they selectively output the power supply voltage Vcc when the output of the monostable multivibrator is inverted. When a dropout detection signal b is generated by the changeover switches 31 and 32 and detected by the monostable multivibrator 33, the bits $D_0$ and $D_1$ are each replaced by "1" over four clock periods. Each of the bits $D_0$ through $D_7$ of the data output from the dropout code replacement circuit 3 is supplied to one of the 8-bit serial-to-parallel (referred to as S-P hereinafter) conversion circuits 41a to 41h in the field memory 4. By these S-P conversion circuits 41a to 41h, the output data of the dropout code replacement circuit 3 is formed into a 64-bit data , block grouped for every 8 sample portion, namely, for every data output during 8 clock periods, to be supplied to a memory 42. The memory 42 is constructed so as to be able to store 64-bit data for one address, 8 sample portions of data are sequentially written by write and read address signals d and e, respectively, and write and read control signals c and f, respectively, that are output from the memory control circuit 5, and the 8 sample portions of data written are sequentially read out. Each of the data block consisting of 8 sample portions of data read out of the memory 42 is supplied to each of the parallel to serial (referred to as P-S hereinafter) conversion circuit 43 by being grouped for every bit. By means of these P-S conversion circuits 43a to 43h, 8 sample portions of data are sequentially output in the order they are generated.

With the constitution set forth above, time axis correction can be executed simultaneously with regeneration and signal processing of the video signal, similar to the device in FIG. 8. Assume that the address signal supplied to the field memory 4 from the memory control circuit 5 varies as shown in FIG. 3(A). and that address designation is executed by fetching the address signal in the field memory 4 by means of a falling edge of the address selection signal in the read control signal f, as shown in FIG. 3(B). and further that reading of the data written in a designated address is executed by the address signal that was fetched immediately before by means of a falling edge of the data output signal in the read control signal f, as shown in FIG. 3(C). Then, data blocks $\alpha$ to $\gamma$ written in address A to C, respectively, as shown in FIG. 3(D). are read out sequentially, and data forming the respective data blocks are sequentially output by the P-S conversion circuits 43a to 43h.

Here, if there exits a dropout code in the data for the 4 sample portions following the data at the third block in the data block $\alpha$, then the dropout code begins to be detected starting with the time (time $t_1$) when the data in the third block begins to be output from the field memory 4, and the detection of the dropout code will be completed by the time (time $t_2$) at which the address selection signal falls off. Accordingly, even if there is included noise components due to dropout in the data for the eighth clock in the data block B to be read out next, namely, in the data output after an elapse of time corresponding to 13 clock periods from the time $t_1$ (namely, at the time $t_3$). dropout correction can be accomplished by setting the delay time for the delay circuit 10 to a value greater than that corresponding to 13 block periods which replaces the data block $\beta$ with the data block for the time 2H earlier.

Further, since a code in which only the two bits of the lowest order in the output data of the delay circuit 10 are replaced by "1" is used as the dropout code, influence of the code on the image is less compared with the case of using a code in which all of the bits in the output data of the delay circuit 10 are replaced by "1". Namely, when a data including the dropout code is output from the field memory 4, and the read address of the field memory 4 is given the value corresponding to the time 2H earlier, after the dropout code is detected so that even if it is arranged to judge that there occurred a dropout when a code with all of the bits replaced by "1" is detected even for one clock period, the dropout code is supplied to the D/A conversion circuit 9 for at least one clock period. Therefore, if a video data immediately before and after the dropout code has a value corresponding to such a low level as [(MSB)00001111(LSB)], the dropout code will erroneously be output as a data corresponding to the value of an extremely bright level of [(MSB)11111111(LSB)], making the image extremely unsightly to look at due to abnormally high brightness in parts of the image. In the present embodiment, however, even when a dropout code is output as a video data, the result is only a change in the values of the lower order bits to "1" so that there will not occur a situation in which the image becomes awkward to look at due to abnormally high brightness in parts of the image.

In addition, in the present embodiment, use is made of a code formed by a bit group in which the low-order two bits are "1" for more than four clock periods. Accordingly in contrast to the case, for example, where use is made of a code obtained by replacing the least significant bit of a data generated during one clock period by "1". it becomes necessary to designate the least significant bit to be used exclusively for the dropout code, in the present embodiment use is made of a code formed by a bit group in which the low-order two bits are "1" for more than four clock periods as the dropout code, so that it is not necessary to designate the least significant bit as dedicated to the dropout code, and hence there will not take place a reduction in the accuracy of the video signal.

Moreover, in the device shown in FIG. 1, there exists a possibility of having a pattern identical to the dropout code in the video data, and the probability for its occurrence becomes smaller with increasing length of the period after which the low-order two bits are placed by "1" in order to generate a dropout code, increasing the accuracy for detecting the dropout code. Then, however, the time required for detecting the dropout code has to e increased. With this situation in mind, a device which is capable of improving the accuracy of dropout detection and at the same time reducing the time required for its detection is shown in FIGS. 4 and 5.

In FIG. 4, playback unit 1, A/D conversion circuit 2, dropout code replacement circuit 3, field memory 4, memory control circuit 5, dropout code detection circuit 8, D/A conversion circuit 9 and delay circuit 10 are connected as in FIG. 1. In the present embodiment, however, output data of the delay circuit 10 is supplied to the dropout code replacement circuit 3 via a pattern inhibition circuit 11. The pattern inhibition circuit 11 is constructed in such a way that when the low-order two bits in the output data of the delay circuit 10 becomes "1" for four clock periods and the output data becomes identical to the dropout code, the code is replaced by another code.

Figure 5:
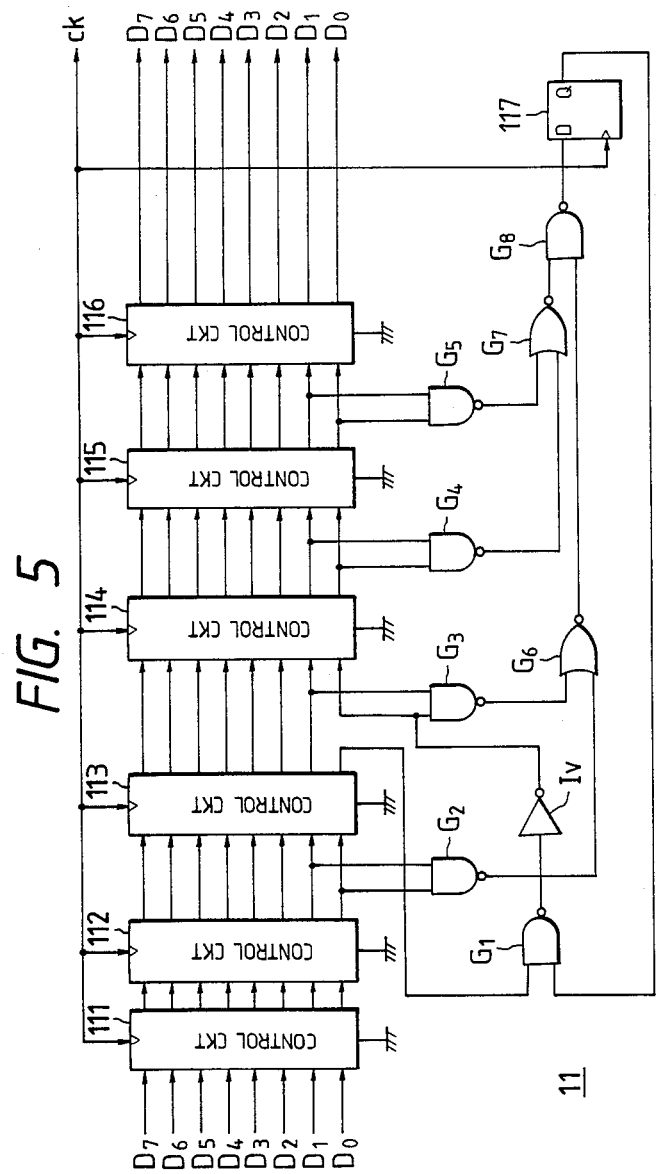
FIG. 5 is a circuit diagram showing a concrete circuit example for a part of the device shown in FIG. 4.

A concrete constitution of the pattern inhibition circuit 11 for the case where "n", the quantization bit number for the A/D conversion circuit 2, is equal to 8 is shown in FIG. 5.

In FIG. 5, each of the bits $D_0$ to $D_7$ of the 8-bit digital data output from the delay circuit 10 is supplied to each of the eight input terminals of the 8-bit parallel register 111. The parallel register 111 is connected along with the parallel registers 112 to 116 so as to form a shift register. That is, each output of the parallel registers 111 to 115 is supplied to each input terminal of the parallel registers 112 to 116. However, the least significant bit in the output data of the parallel register 113 is supplied to the parallel register 114 through a NAND (nonconjunction) gate $G_1$ and an inverter Iv.

The clock input terminals of these parallel registers 111 to 116 are supplied with a clock ck. A video signal digitized by a rising edge of the clock ck is output after passing sequentially to the parallel registers 111 to 116.

The low-order two bits of, each input data of the parallel registers 113 to 115 are used as each input to the 2-input NAND gates $G_2$ to $G_5$. The outputs of the gates $G_2$ to $G_3$ become one of the inputs to a NAND gate $G_8$ via a NOR (nondisjunction) gage $G_6$. Further, the outputs of the gate $G_4$ and $G_5$ become another input to the NAND gage $G_8$ via a NOR gate $G_7$. Accordingly, when the low-order two bits in each input data to the parallel registers 113 to 115 all become "1", namely, when a data with low-order two bits are "1" for four clock periods is supplied, the output of the NAND gate $G_8$ goes to a low level.

Figure 6:
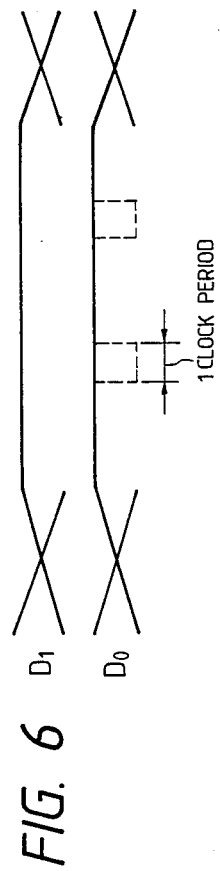
FIG. 6 is a waveform chart showing the operation of the device in FIG. 4.

The output of the NAND gate $G_8$ becomes the D input of the D-type flip-flop 117. The clock input terminal of the D-type flip-flop 117 is supplied with the clock ck. The Q output of the D-type flip-flop 117 becomes one of the inputs to the NAND gate $G_1$ Therefore, when there is supplied a data in which the low-order two bits are "1" for four clock periods, the output of the NAND gate $G_8$ goes to a low level bringing the D-type flip-flop 117 to the reset state, and the output of the gate $G_1$ goes to a high level. Then, the least significant bit $D_0$ of the input data of the parallel register 114 becomes "0", and the least significant bit $D_0$ output from the parallel register 116 becomes as shown by the broken line in FIG. 6, so that there will not be output a data in which the low-order two bits are "1" for four clock periods, from the pattern inhibition circuit 11.

Accordingly, in the device shown in FIG. 4 and FIG. 5, even when there exists a data having a pattern identical to that of the dropout code in the video data, the pattern of the data is changed to another pattern which is different from that of the dropout code, so that erroneous dropout correction can be prevented. Further, since the pattern change is effected by a change in the value of the least significant bit $D_0$, its influence on the image can be limited to a small extent.

In FIG. 7 is shown still another embodiment of the present invention. The constitution of the device is similar to the device in FIG. 1 except for that a variable delay circuit 12 which gives a delay to an output data of the dropout code replacement circuit 3 by a time corresponding to the time axis error, between the dropout code replacement circuit 3 and the field memory 4. However, writing of data in the field memory 4 is carried out by the use of a signal with fixed frequency. With such a constitution, action similar to the device in FIG. 1 can be obtained.

In the foregoing, description has been given in connection with the case where a field memory is used as the memory, but the present invention can also be applied to the case where use is made of a frame memory.

Moreover, in the above embodiments, the delay circuit 10 was connected between the A/D conversion circuit 2 and the dropout code replacement circuit 3. However, instead of connecting the delay circuit 10, an analog delay line may, be connected between the playback unit 1 and the A/D conversion circuit.

Furthermore, the dropout code has been assumed in the above embodiments to be a code obtained by replacing the low-order two bits by "1" for more than four clock periods. As for the dropout code, however, it is by no means limited to this type alone, and use may be made of any code with a pattern which has a small probability of occurrence in an ordinary video data, such as a code obtainable by replacing the least significant bit by "1" or "0" for a duration of eight clock periods, a code obtained by replacing the least significant bit by "1" and "0" alternately for a duration of eight clock periods, and a code obtainable by replacing the low-order two bits with "0" for a duration of four clock periods. Further, the low-order bits to be replaced by prescribed values need not be limited to $D_0$ and $D_1$, but those having as little an influence as possible on the image are desirable.

As presented in detail in the foregoing, the signal regeneration processor according to the present invention has a constitution by which dropout correction can be achieved by replacing a predetermined number of low-order bits in a signal obtained by delaying a digitized regenerated signal by a prescribed length of time, with a predetermined code in accordance with the dropout detection signal, and then by writing the signal in a signal processing memory, followed by a processing given in accordance with the prescribed code found in the data read from the memory. Because of this arrangement, it is possible to confirm, in advance, the presence of a dropout on the reading side of the memory and to carry out a correction to the dropout by a manipulation on the address of the memory, which makes it possible to do away with a line memory for replacing video data to be used at the time of giving a dropout correction. At the same time, influence on the image of the prescribed code in the data read from the memory is slight and there is no need of providing separately for a memory for dropout detection signal so that it is possible to accomplish a dropout correction inexpensively by the use of a device with a simple constitution.

Various modifications will become possible for those skilled in the art after receiving the teachings of the present disclosure without departing from the scope thereof.

What is claimed is:

1. A signal regeneration processor for carrying out signal processing for a signal by converting a sample value obtained by sampling after reading a video signal recorded in a recording medium, into a digital data to write it in a memory, and by reading the data written in the memory by means of a prescribed reference signal, comprising:

dropout detection means for generating a dropout detection signal when there occurs a dropout at the time of reading the video signal from said recording medium;

delay means for delaying the digital data to be written in said memory by a prescribed length of time; and code replacement means for replacing only a prescribed number of low-order bits in an output data of said delay means by a prescribed code in response to the dropout detection signal generated by said dropout detection means, whereby dropout correction is carried out in accordance with said prescribed code in the data read from said memory.

2. The signal regeneration processor as claimed in claim 1, further comprising memory control means for providing dropout correction by changing the read address of said memory uniformly synchronized with said prescribed reference signal, said memory control means changing the read address to the value at an earlier time by a prescribed number of synchronizations.

3. A signal regeneration processor for processing a reproduced video signal recorded on a recording medium the processor comprising:

a playback unit for reproducing a video signal from the recording medium, and for generating a dropout detection signal only when a dropout occurs during the reproduction of the video signal from the recording medium;

digital converting means for converting the reproduced video signal to a first digital signal;

dropout code replacement means for receiving the digital and the generated dropout detection signals and for outputting one of the first digital signal and a second digital signal, said dropout code replacement means replacing, upon receiving the generated detection signal, only a predetermined number of low order bits of the first digital signal received by said digital converting means with a first predetermined code to thereby output the second digital signal;

delay means coupled between said digital converting means and said dropout code replacement means for delaying the first digital signal;

memory means, coupled to said dropout code replacement means, for storing, in a designated address, a digital signal output from said dropout code replacement means;

dropout detecting means for detecting the first predetermined dropout code in the predetermined number of bits in a digital signal read out of said memory means and for generating a dropout code detection signal in response to detection thereof;

memory control means, coupled to said memory means and to said dropout detecting means, said memory control means being operable only upon receiving said dropout code detection signal from said dropout code detecting means, for changing a read out address of said memory means to that read out address which occurred a predetermined number of synchronizations before, thereby reading out the digital signal contained in the read out address which occurred the predetermined number of synchronizations before; and analog converting means, coupled to said memory means, for converting a digital signal read out of said memory means to an analog video signal.

4. The processor according to claim 3, wherein said predetermined number of low-order bits is the least two significant bits, and wherein said dropout code detection means generates the dropout code detection signal when the memory means reads out four successive digital signals, each containing the first predetermined code in the predetermined number of bits.

5. The processor according to claim 3, further comprising a pattern inhibiting circuit having its output coupled to an input of said dropout code replacement means, said pattern inhibiting circuit determining whether the predetermined number of bits of the first digital signal contains the first predetermined code, and replacing, only upon determining that the predetermined number of bits of the first digital signal contains the first predetermined code, the predetermined number of bits of the first digital signal with a second predetermined code which is different from the first predetermined code, whereby said dropout code detecting means will only generating the dropout code detection signal when said playback unit generates the dropout detection signal.

6. The processor according to claim 3, further comprising a variable delay circuit, coupled between said dropout code replacement means and said memory means, for correcting a time axis error caused by the recording medium.

7. The processor according to claim 3, wherein said memory means is a field memory means.

8. The processor according to claim 3, wherein said memory means is a frame memory means.

* * * * *